(12) United States Patent
Wolfe et al.

(10) Patent No.: US 11,915,471 B2
(45) Date of Patent: Feb. 27, 2024

(54) EXCEEDING THE LIMITS OF VISUAL-LINGUISTIC MULTI-TASK LEARNING

(71) Applicant: salesforce.com, inc., San Francisco, CA (US)

(72) Inventors: Cameron Wolfe, Austin, TX (US); Keld Lundgaard, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 150 days.

(21) Appl. No.: 17/485,985

(22) Filed: Sep. 27, 2021

(65) Prior Publication Data

US 2022/0254150 A1 Aug. 11, 2022

Related U.S. Application Data

(60) Provisional application No. 63/146,113, filed on Feb. 5, 2021.

(51) Int. Cl.
*G06V 10/80* (2022.01)
*G06V 30/194* (2022.01)
*G06V 10/776* (2022.01)

(52) U.S. Cl.
CPC .......... *G06V 10/811* (2022.01); *G06V 10/776* (2022.01); *G06V 30/194* (2022.01)

(58) Field of Classification Search
USPC ........................................ 382/155–156, 159
See application file for complete search history.

(56) References Cited

U.S. PATENT DOCUMENTS

| 11,562,147 | B2 * | 1/2023 | Wang | G06F 18/21 |
| 11,740,879 | B2 * | 8/2023 | Huang | G06F 3/0484 |
| | | | | 715/762 |
| 2015/0072332 | A1 * | 3/2015 | Lin | G06Q 30/0202 |
| | | | | 434/322 |
| 2019/0080207 | A1 * | 3/2019 | Chang | G06F 16/7837 |
| 2022/0414746 | A1 * | 12/2022 | Tate | G06Q 30/0635 |
| 2023/0031702 | A1 * | 2/2023 | Li | G06V 10/82 |

(Continued)

OTHER PUBLICATIONS

Lu, Jiasen, et al. "Vilbert: Pretraining task-agnostic visiolinguistic representations for vision-and-language tasks." Advances in neural information processing systems 32 (2019),arxiv (Year: 2019).*

(Continued)

*Primary Examiner* — Ishrat I Sherali
(74) *Attorney, Agent, or Firm* — Butzel Long

(57) ABSTRACT

Methods, computer readable media, and devices for exceeding the limits of visual-linguistic multi-task learning are disclosed. One method may include identifying a multi-modal multi-task classification dataset including a plurality of data examples, creating a transformer machine learning model to predict a plurality of categorical attributes of a product, and training the transformer machine learning model based on the multi-modal multi-task classification dataset using an alpha decay schedule and dynamically allocating task-specific parameters for at least one of the plurality of task-specific classification heads based on task complexity.

20 Claims, 9 Drawing Sheets

(56) References Cited

U.S. PATENT DOCUMENTS

2023/0154159 A1* 5/2023 Kim .................. G06N 3/008
 382/159
2023/0306723 A1* 9/2023 Ma .................. G06V 10/776
 382/132

OTHER PUBLICATIONS

R. Dasgupta and A. M. Namboodiri, "Leveraging multiple tasks to regularize fine-grained classification," 2016 23rd International Conference on Pattern Recognition (ICPR), Cancun, Mexico, 2016, pp. 3476-3481, doi: 10.1109/ICPR.2016.7900172 (Year: 2016).*

Wolfe et al., Exceeding the Limits of Visual-Linguistic Multi-Tasking Learning, arXiv: 2107.13054v1 [cs, AI] Jul. 27, 2021, pp. 1-10. (Year: 2021).*

Hu et al., UniT: Multimodal Multitask Learning with a Unified Transformer, arXiv:2102.10772v3 [cs.CV] Aug. 18, 2021, pp. 1-16 (Year: 2021).*

* cited by examiner

200

400

500

700

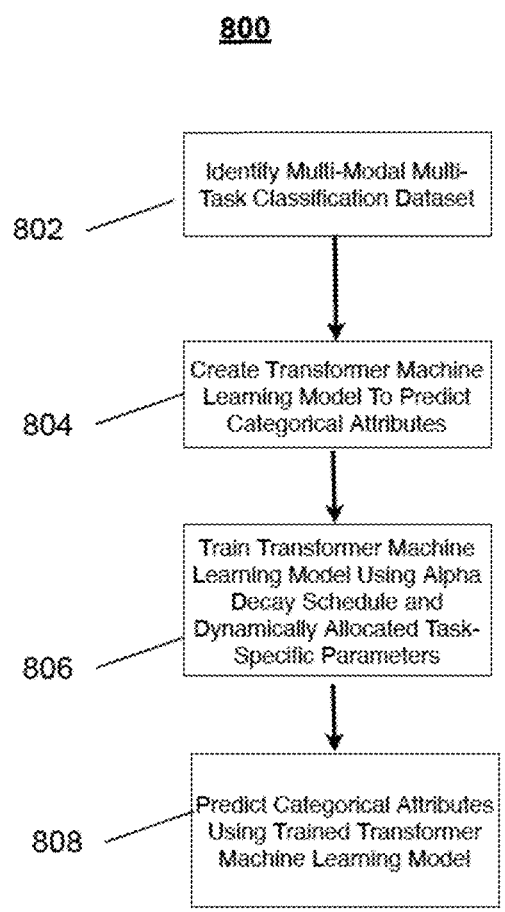

EXCEEDING THE LIMITS OF VISUAL-LINGUISTIC MULTI-TASK LEARNING

TECHNICAL FIELD

One or more implementations relate to the field of deep learning; and more specifically, to exceeding the limits of visual-linguistic multi-task learning.

BACKGROUND

The transformer model has undoubtedly revolutionized deep learning research. Shortly after being proposed for neural machine translation, the transformer model was adopted for self-supervised pre-training and transfer learning, allowing large models to be pre-trained, made publicly available, and fine-tuned to achieve remarkably high performance on downstream tasks. As a result, transformer models became popular in domains beyond natural language processing (NLP), such as computer vision, multi-modal deep learning, and even music generation. Currently, the use cases for transformers are constantly expanding as deep learning practitioners develop new applications.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 8 is a flow diagram illustrating a method for use with a multi-modal classification model according to some example implementations.

DETAILED DESCRIPTION

Figure 1:
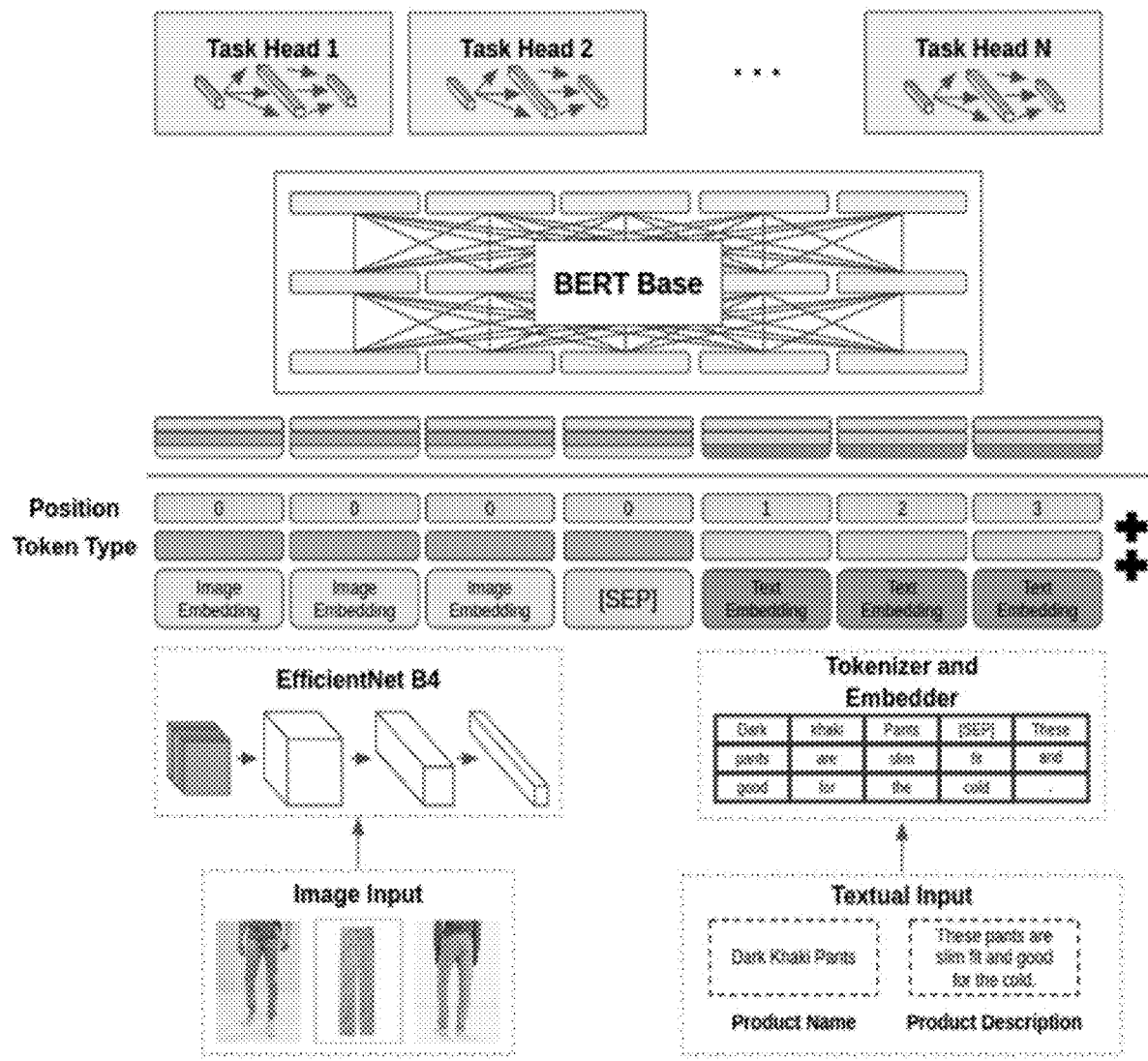
FIG. 1 is a block diagram illustrating a multi-modal classification model according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide methods, computer readable media, and devices for exceeding the limits of visual-linguistic multi-task learning within a machine learning environment. In various implementations, a method may include identifying a multi-modal multi-task classification dataset, creating a transformer machine learning model to predict a plurality of categorical attributes of a product, and training the transformer machine learning model based on the multi-modal multi-task classification dataset using an alpha decay schedule and dynamically allocating task-specific parameters for at least one of a plurality of task-specific classification heads based on task complexity.

In some implementations, the multi-modal multi-task classification dataset may include a plurality of data examples and at least one data example may be associated with a product and may include textual data describing the associated product and a plurality of images of the associated product.

In some implementations, the transformer machine learning model may include a preprocessing layer, a transformer layer, and an output layer. In various implementations, the output layer may include a plurality of task-specific classification heads. In some implementations, a task may represent a prediction of a categorical attribute.

In various implementations, dynamically allocating task-specific parameters for at least one of the plurality of task-specific classification heads based on task complexity may include assigning a normally-distributed complexity score to at least one task, dividing the plurality of task-specific classification heads into four quartiles based on the normally-distributed complexity score, and assigning a first number of task-specific parameters to a first quartile of task-specific classification heads, a second number of task-specific parameters to a second quartile of task-specific classification heads, a third number of task-specific parameters to a third quartile of task-specific classification heads, and a fourth number of task-specific parameters to a fourth quartile of task-specific classification heads. In some implementations, the first number is less than the second number, the second number is less than the third number, and the third number is less than the fourth number.

In some implementations, the plurality of data examples may include data examples from a plurality of ecommerce websites and, for at least one product offered by at least two of the plurality of ecommerce websites, the plurality of categorical attributes may include at least a first categorical attribute having a different value for the at least two of the plurality of ecommerce websites and at least a second categorical attribute having a different value for the at least two of the plurality of ecommerce websites.

In some implementations, the plurality of categorical attributes may include one or more of type and category.

In some implementations, the alpha decay schedule may be one of demon, linear, cosine, and exponential.

In some implementations, the first number of task-specific parameters may be 64, the second number of task-specific parameters may be 128, the third number of task-specific parameters may be 512, and the fourth number of task-specific parameters may be 1024.

In some implementations, the transformer model may include a bidirectional encoder representations from transformers architecture.

In various implementations, the method may further include utilizing the trained transformer machine learning model to predict categorical attributes of a product.

Multi-task learning has been a popular topic in deep learning for some time. Formative works in this area explored methods of optimally weighting tasks within a group or modifying gradients to prevent conflict between tasks. Following these initial efforts, numerous methods of handling objectives comprised of multiple tasks were proposed. However, such methods share a common goal of training a unified model over a group of tasks that performs well and limits requirements for task-specific parameters. Multi-task learning approaches have since been applied to numerous domains, such as forming sentence embeddings, solving computer vision tasks, and even performing multi-modal reasoning. Several, more comprehensive, summaries of developments in the multi-task learning space are also available.

The introduction of the transformer architecture and bidirectional encoder representations from transformers (BERT) revolutionized deep learning for NLP and several other domains. Shortly after their introduction, transformer architectures were applied to multi-modal data, leading to numerous variants. Such attention-based approaches for multi-modal learning may be roughly categorized into single-stream and separate-stream methodologies, based on whether all modalities are processed separately or as a single sequence. Generally, single-stream architectures may be popular because of their simplicity and performance. Many of such single-stream models for multi-modal deep learning may share identical architectures to BERT and may even be initialized with the same pre-trained weights. For multi-modal classification, it has been shown that BERT-style, single-stream architectures perform well and are easy to train.

Transformer models, especially variants of BERT, have become popular in the multi-task learning community. Due to their many parameters (e.g., 110 M parameters in BERT base and 340 M parameters in BERT large), these models may be capable of learning generalizable representations for many tasks simultaneously. For example, BERT models have been used to simultaneously solve multiple general language understanding evaluation (GLUE) tasks, leading to improved generalization across all tasks. Similarly, multi-task learning may be extended to multi-modal applications, leading to the development of visual-linguistic models trained on diverse sets of tasks. In these cases, multi-task learning may be shown to lead to improved overall model performance on most tasks, proving information from other tasks enables positive transfer of representations.

The current trend in transformer research (and deep learning in general) is towards larger models and datasets. Despite the widespread moral and practical questioning of this trend, the deep learning community proceeds forward and has not yet reached an upper bound at which increased model capacity does not improve performance. In fact, deep learning models have been shown to discover high-performing, generalizable solutions even when significantly over-parameterized. In general, these findings illustrate that one may benefit from the use of a larger model. However, such benefit comes at the cost of increased inference and training time, possibly to the point of complete intractability.

So, where does this leave deep learning practitioners if they want to reap the performance benefits of larger transformer models? One option may be to discover efficient, low-cost transformer variants that still perform well. Additionally, the transformer may be pruned to reduce inference time. Despite the valuable contributions of these methodologies, however, BERT remains computationally expensive to train, especially if being done from scratch. Inspired by these issues, this work explores an orthogonal direction of research. Namely, if the computational complexity of the transformer cannot be completely avoided, how can we get the most benefit from a single model?

Multi-task learning (MTL) with transformer models has been explored by previous work, which has led to the development of numerous tricks and best practices. Because BERT models encode redundant data within their representations and can be aggressively pruned without deterioration of performance, such models intuitively contain sufficient capacity to perform well in the MTL domain. However, no work has yet explored the limits of BERT with respect to MTL (i.e., most works solve only 10-20 tasks simultaneously). In contrast, various implementations disclosed herein may utilize a multi-modal BERT model to explore the limits of MTL by solving hundreds of tasks simultaneously with a single model. Various implementations may include:

Performing extensive ablation experiments with a multi-task learning dataset of 100 tasks (i.e., still an order of magnitude beyond current work) to reveal best practices for large-scale MTL (i.e., ≥100 tasks) with BERT.

Developing a novel "Dynamic Parameter Allocation" (DyPA) scheme to dynamically assign more parameters to difficult tasks, while limiting task-specific parameters on less complex tasks.

Demonstrating that the capacity of BERT in the MTL domain is beyond previous understanding, capable of solving hundreds of tasks with a single model.

Each data example within the dataset may be associated with a single product from an e-commerce website. A product may have standardized data associated with it, including textual data (e.g., the name or description of a product) and many images. Websites may assign certain categorical "attributes" to products, which may be predicted given the standardized textual and image data associated with each product. Two of such attributes that are known to be present across all e-commerce websites are the product "type" and "category" attributes. However, the possible values, or categories, for these attributes may not be standardized across websites. As a result, thousands of unique classification tasks, which share similarly structured input data, may be created by predicting the product "type" and "category" attributes for each website (i.e., each attribute/website pair may form a single task because the set of output classes is not shared between websites). Furthermore, many of these attribute prediction tasks may be difficult to solve in isolation, due to a lack of sufficient labeled data (i.e., some websites may have very few examples available for training). Therefore, the possibility of using MTL to obtain positive inductive transfer on low-resource tasks may be appealing, especially because many of these tasks are similar in nature.

Figure 2:
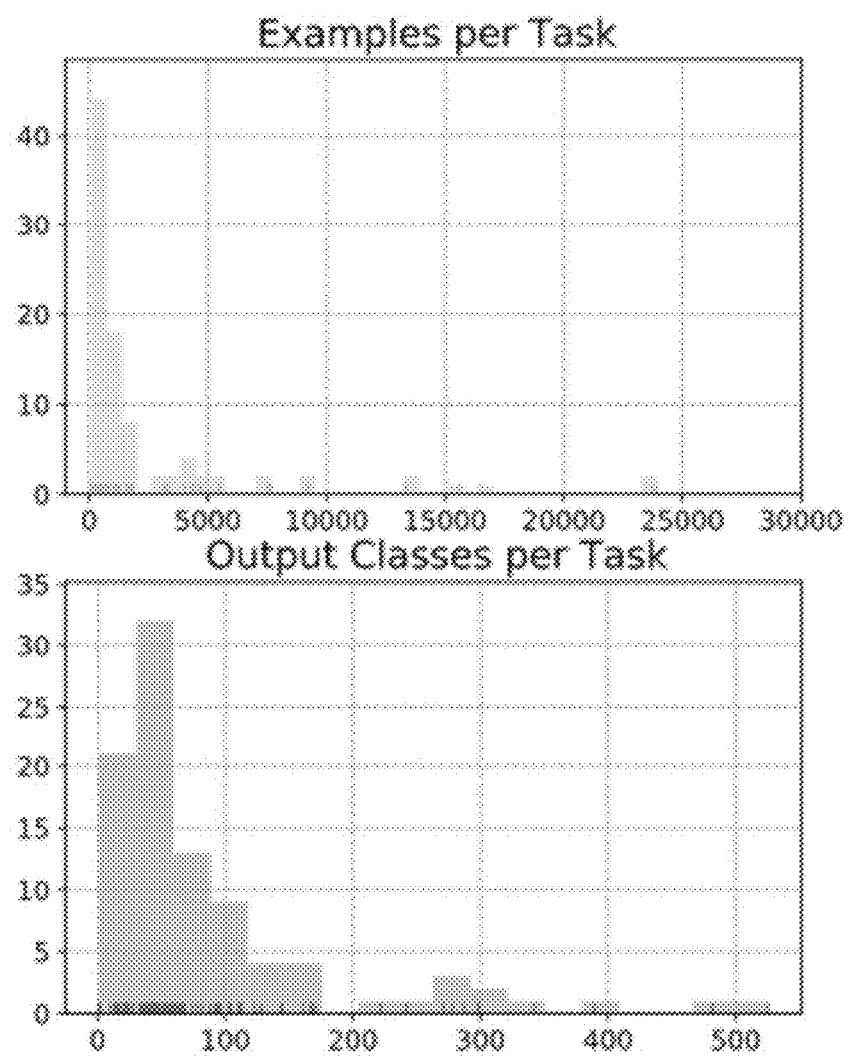
FIG. 2 illustrates sample histograms according to some example implementations.

The dataset used in the majority of experiments, which is comprised of over 250,000 products, contains 100 attribute prediction tasks, sampled from 50 unique websites (i.e., product "type" and "category" prediction for each unique website). The distribution over the number of labels and output classes for each task in the 100-task dataset is shown in FIG. 2. As can be seen, there may be significant variability in the properties of each task. Additionally, many tasks may have very few training labels, which makes this a difficult and interesting test case for large-scale MTL. Various implementations may provide large-scale experiments using datasets with hundreds of unique tasks. These larger datasets may be constructed identically, but with the use of more unique e-commerce websites.

Various implementations may include a model architecture modified to handle the different structure of the data. The model may share the BERT-base architecture and may be initialized with the associated pre-trained weights. The processing of textual data may be identical to that of BERT. Image data may be first passed through the EfficientNet-B4 model to obtain an image embedding for each unique image. This may be done as a preprocessing step, and the Efficient-Net model may not be fine-tuned during training. Image embeddings may be converted to the correct size using a linear transformation, and all image embeddings associated with a product may be concatenated with the textual sequence to form a single input sequence. The input sequence may contain between zero and 128 unique image embeddings for a single product.

Prior to passing this input sequence to the model, additive token type and position embeddings may be added to each token in the sequence. Image and textual tokens may receive different token type embeddings. The additive position embedding may be kept at zero for all image tokens (i.e., the images are not ordered), but incremented for the text tokens, as the position of each textual token may be significant.

All BERT parameters (i.e., including embedding layers) may be fine-tuned and shared across tasks. For each task, the output of BERT may be passed into a task-specific classification head to perform the final classification (i.e., the correct task must be specified as part of the forward pass). A detailed illustration of this model is presented in FIG. 1.

Because the model may be trained to simultaneously solve hundreds, or even thousands, of tasks, evaluating the model's performance is not trivial. Generally, various implementations aim to perform well across all tasks. However, performing equally on all different tasks may often not be possible, as certain tasks may contain significantly fewer examples or even be more difficult to solve. As a result, various implementations may instead choose to evaluate model performance based on several (hopefully comprehensive) metrics, which can be summarized as follows:

Global Accuracy: The global accuracy of the model across all tasks (i.e., tasks with more examples contribute more to this metric).

Mean Accuracy: The mean value of the model's accuracy on each task. In other words, the accuracy may be computed separately for each task, and the mean of these accuracies may be reported (i.e., each task contributes equally to this metric).

T10 Accuracy: This metric considers the 10% of tasks that contain the most labels. The accuracy may be computed separately for each of these tasks, and the mean of these accuracies may be reported (i.e., mean accuracy of high-resource tasks).

B10 Accuracy: This metric considers the 10% of tasks that contain the fewest labels. The accuracy may be computed separately for each of these tasks, and the mean of these accuracies may be reported (i.e., mean accuracy of low-resource tasks).

All of the above metrics may be evaluated on hold-out validation sets within each task (i.e., constructed with a uniform 80-20 split). By evaluating a model's performance in this way, a comprehensive understanding of the model's performance across all tasks may be gained by viewing only a few metrics.

All experiments may be run for 15 total epochs, where an epoch is defined as a cycle through a number of data examples equal to the size of the full dataset. All experiments may use a batch size of 64, which was the maximum size to fit in a single Tesla V100 GPU. Each batch may be comprised entirely of examples from a single task (i.e., different tasks may have different numbers of output classes). All models may be trained with the AdamW optimizer. In some implementations, other optimizers may be tested with no significantly improved performance. Each test may be run on a single GPU for simplicity, and different experiments were parallelized across multiple GPUs to make experiments computationally feasible (i.e., over 200 BERT models were trained within this work).

The major value of this work may be the extensive ablation experiments over the 100-task dataset that led to superior performance in the large-scale MTL domain. In this section, various implementations may empirically motivate all of the choices that were made in arriving at a final training methodology, demonstrating the performance benefits of each aspect of an approach.

Because many tasks may be optimized simultaneously, achieving convergence with a large-scale MTL model may not be trivial. In fact, numerous initial attempts at model training on the 100-task dataset diverged completely. Eventually, various implementations discovered that convergence could be achieved by i) using a low learning rate throughout training ii) freezing the shared transformer weights during initial epochs or iii) utilizing a well-tuned learning rate warm up schedule.

Although the low learning rate strategy led to convergence, the training process was slow compared to other methods, causing it to never reach comparable accuracy in a fixed number of epochs. This convergence speed may be improved by training the model at a higher initial learning rate with the shared transformer weight frozen, then decreasing the learning rate by 10× when the transformer weights were fine-tuned. However, the best performance was achieved using a well-tuned learning rate schedule, comprised of an initial warm up phase followed by a step schedule. In particular, this learning rate warm up strategy linearly increases the learning rate 10× over the first four epochs (i.e., 1e-4 for 1e-5 in our case) and decreases the learning rate by 10× at epochs eight and 12 (i.e., a step schedule).

Figure 3:
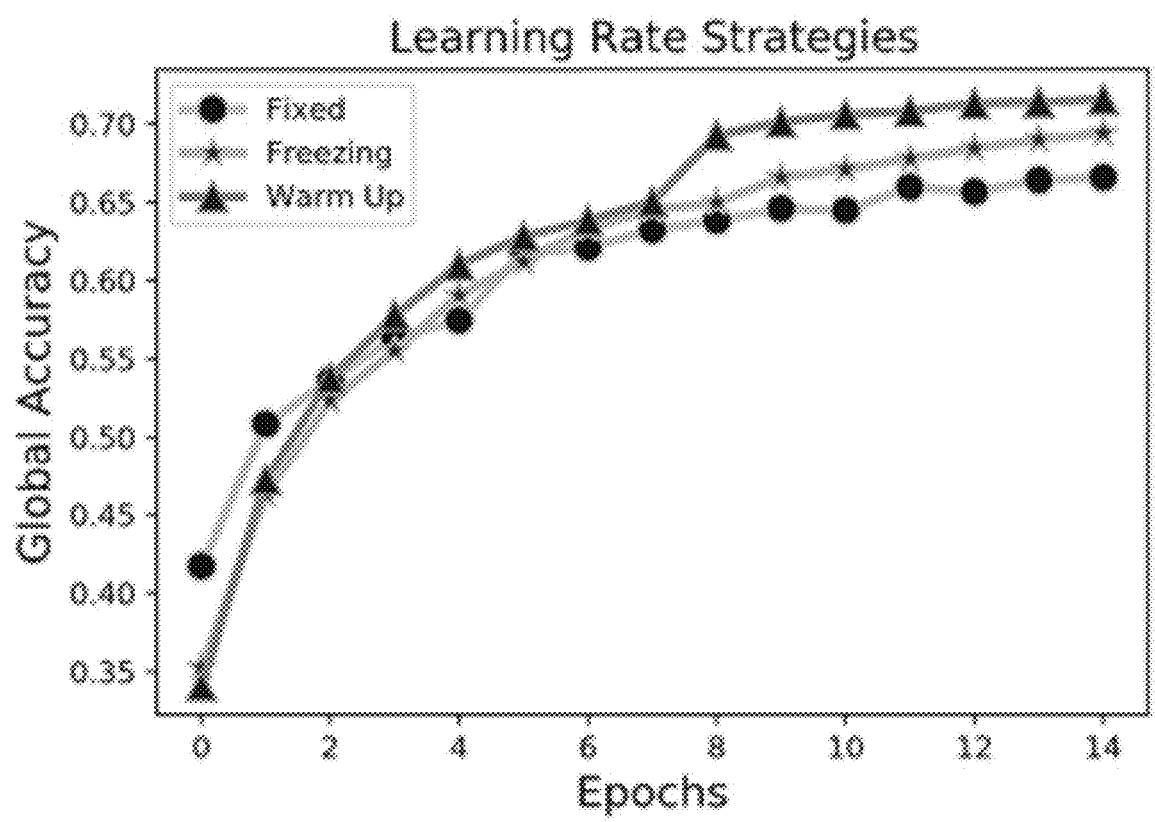
FIG. 3 illustrates a sample graph of learning rate strategies according to some example implementations.

A comparison of each of these optimization strategies is presented in FIG. 3. It can be seen that the learning rate warm up strategy, if tuned properly, may converge quickly and reach a stable plateau in accuracy. As a result of its high performance and stable convergence in comparison to other approaches, this warm up strategy was used in the rest of experiments.

Each batch during training may contain examples sampled from a single task. However, the best approach for sampling a task to be used within each batch has not been standardized, especially in the large-scale MTL domain. The naive approach would be to uniformly sample a task for each batch. On the other hand, one could sample tasks with a probability that is proportional to the number of data examples for that task (i.e., referred to as "data size"

sampling). These two strategies can also be interpolated to yield the probability of sampling task T for a given batch, P(T), as follows.

$$P(T) = \left(\frac{N_T}{N}\right)^\alpha$$

where $N_T$ is the number of training examples for task T, N is the number of training examples across all tasks, and a is a hyperparameter that interpolates between uniform ($\alpha=0$) and data size ($\alpha=1$) sampling.

Figure 4:
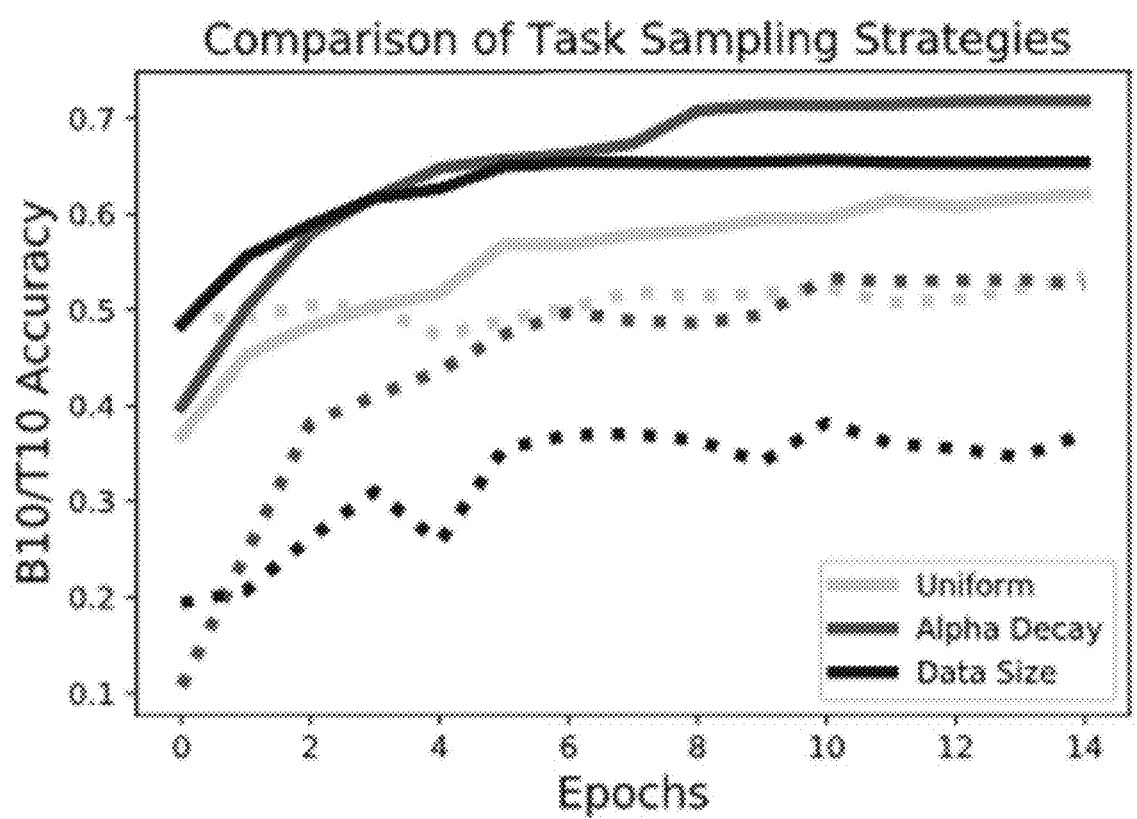
FIG. 4 illustrates a sample graph of task sampling strategies according to some example implementations.

Previous work has shown that annealing schedules for α can yield performance improvements in MTL. To determine whether these claims hold true in the large-scale MTL domain, various implementations may compare decaying the value of α throughout training to data size and uniform task sampling strategies. As can be seen in FIG. 4, α decay significantly outperforms both data size and uniform task sampling. Data-size sampling may yield reasonable performance on tasks with many labels but poor performance on low-resource tasks. A similar trend of poor B10 accuracy was also observed for methods that increase a throughout training (e.g., a linear α schedule from zero to one). However, the use of data size sampling does cause the model to converge more quickly during initial epochs. Uniform sampling results in slower convergence during initial training stages and has poor T10 performance in comparison to a decay.

Although similar α decay methodologies have been investigated in previous work, various implementations may emphasize that the choice of task sampling strategy results in significant performance differences (see FIG. 4), thus revealing that the development of a proper task sampling strategy may be pivotal for achieving high performance in the large-scale MTL domain. This observation inspired an extensive exploration of different α decay schedules to ensure the best possible task sampling strategy was discovered.

Figure 5:
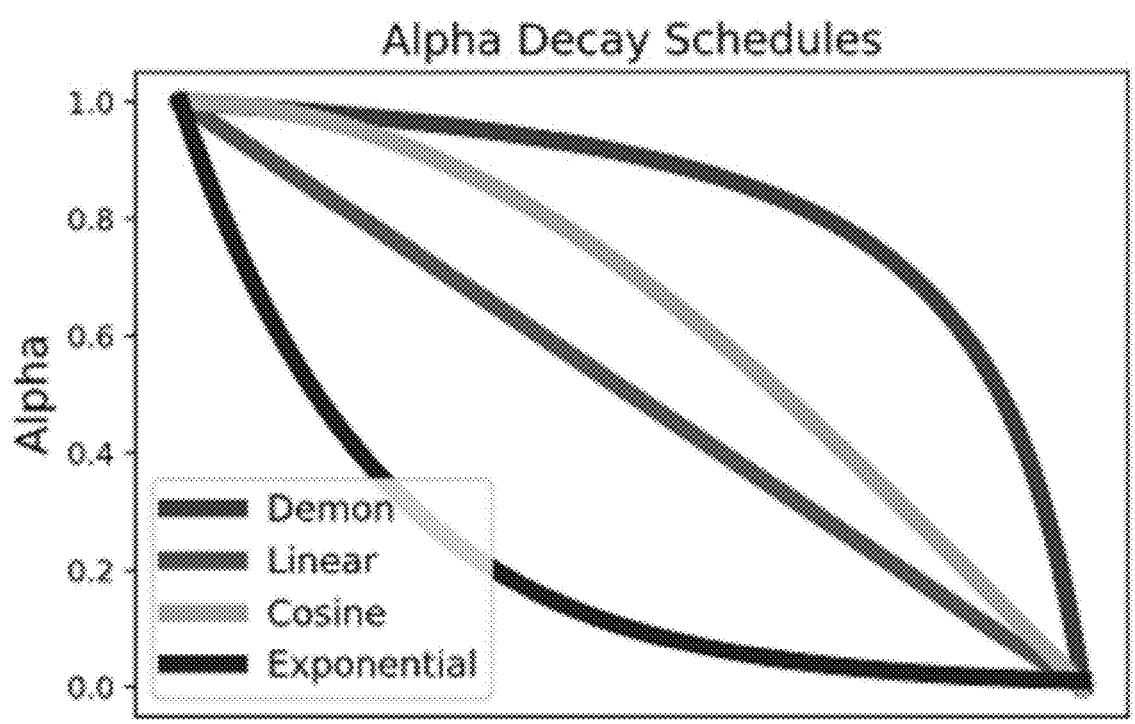
FIG. 5 illustrates a sample graph of alpha decay schedules according to some example implementations.

Although the performance benefits of α decay can be easily observed in FIG. 4, many viable decay schedules exist. Various implementations empirically compare numerous options for α decay, which are depicted in FIG. 5. Exponentially decaying α from 1.0 to 0.1 was found to consistently achieve balanced performance (see Table 1). As a result, some implementations adopt this α decay schedule in the rest of experiments. Intuitively, the exponential α decay schedule works well because it allows data size sampling during the early parts of training, where it is conducive to faster convergence. However, the schedule quickly decays to a lower α value after the initial training stages, which avoids damaging the final performance of the model. Experiments were also performed using restarts, warm up, and cyclical schedules for α, but none of these more complex schedules led to improved performance.

TABLE 1

Model performance for different α decay schedules.

| α Decay Method | | Global Acc. | Mean Acc. | T10 Acc. | B10 Acc. |
|---|---|---|---|---|---|
| Linear | 1.0 → 0.5 | 75.65% ± 0.33 | 74.66% ± 0.42 | 73.56% ± 0.56 | 50.05% ± 1.91 |
|  | 1.0 → 0.1 | 74.84% ± 0.39 | 74.97% ± 0.23 | 72.37% ± 0.48 | 51.70% ± 0.95 |
|  | 1.0 → 0.0 | 75.08% ± 0.64% | 75.31% ± 0.31 | 72.49% ± 0.74 | 52.98% ± 0.29 |
| Exp. | 1.0 → 0.5 | 75.47% ± 0.06 | 74.79% ± 0.12 | 73.33% ± 0.31 | 51.69% ± 0.19 |
|  | 1.0 → 0.1 | 74.50% ± 0.28 | 75.48% ± 0.13 | 71.69% ± 0.31 | 54.09% ± 0.88 |
|  | 1.0 → 0.0 | 72.61% ± 0.21 | 74.86% ± 0.27 | 69.85% ± 1.15 | 52.38% ± 0.72 |
| Cosine | 1.0 → 0.5 | 75.61% ± 0.13 | 74.63% ± 0.11 | 73.71% ± 0.27 | 52.25% ± 0.27 |
|  | 1.0 → 0.1 | 75.48% ± 0.37 | 74.88% ± 0.31 | 73.33% ± 0.50 | 53.02% ± 0.33 |
|  | 1.0 → 0.0 | 75.32% ± 0.36 | 74.47% ± 0.35 | 73.28% ± 0.49 | 51.20% ± 0.91 |
| Demon | 1.0 → 0.5 | 75.40% ± 0.69 | 73.20% ± 1.00 | 73.82% ± 0.69 | 47.76% ± 2.90 |
|  | 1.0 → 0.1 | 75.72% ± 0.24 | 74.51% ± 0.13 | 73.72% ± 0.41 | 52.01% ± 1.51 |
|  | 1.0 → 0.0 | 75.68% ± 0.24 | 74.31% ± 0.10 | 73.84% ± 0.26 | 52.92% ± 0.81 |

Previous work has shown that performing many consecutive iterations on the same task could complicate the optimization process for MTL. Various implementations may obtain the best performance by sampling a new task for every batch during training. Performing multiple consecutive iterations on the same task was found to degrade performance. Interestingly, performing as few as ten consecutive iterations on each task during training led the model to completely diverge. Therefore, it is evident that, in the large-scale MTL setting, sampling a new task as frequently as possible is seemingly conducive to good performance.

Within various implementations, each task must have a task-specific classification head, which cannot be avoided because each task has a unique set of output classes. A "naive" classification head implementation—a fully-connected (FC) layer followed by a nonlinearity—can consume a significant number of parameters, especially as the number of tasks becomes large. For example, within the 100-task dataset, such an FC classification head for each task would account for over 58 million parameters (i.e., roughly 50% of the parameters of BERT base). Therefore, a more parameter-efficient methodology had to be developed to make large-scale MTL more feasible.

Various implementations formulate each task-specific classification head as a low-dimension self-attention module. More specifically, implementations may take the final token sequence outputted from BERT, project the tokens to some lower dimension $d_t$, then perform self-attention at this lower dimension. Then, tokens may be averaged and passed through a linear classification layer to get the final model output. Using this formulation, various implementations may be able to significantly decrease the number of task-specific parameters within the model. For example, with $d_t=64$, the number of task-specific parameters may be reduced by roughly 10× in comparison to using FC task-specific heads.

Figure 6:
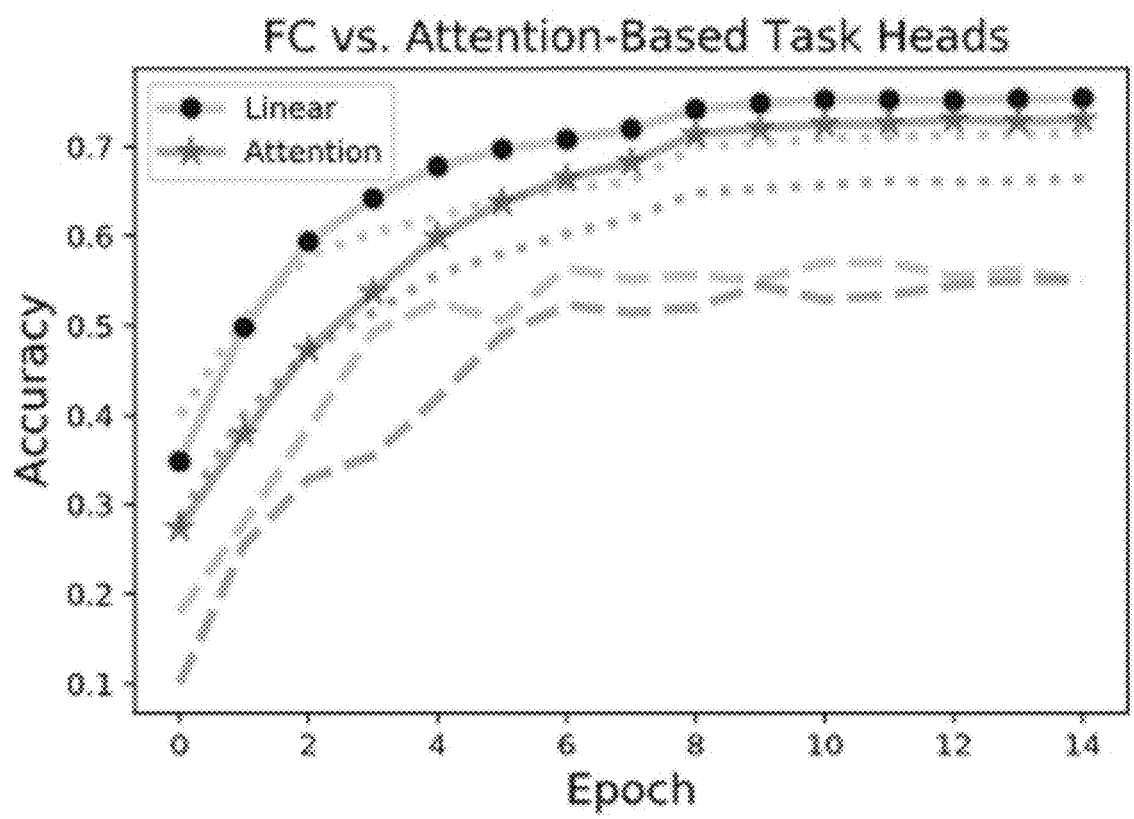
FIG. 6 illustrates a sample graph of fully-connected (FC) vs Attention-Based task heads according to some example implementations.

The performance of FC and attention-based classification heads (i.e., with $d_t=64$) is shown in FIG. 6. As can be seen, the attention-based task-specific heads, despite using 10× fewer parameters, maintain similar performance to the FC classification heads. Because attention-based classification heads achieve comparable performance with significantly fewer parameters, we use them for the rest of experiments.

Although parameter-efficiency makes large-scale MTL more feasible, increasing the number of task-specific parameters may be useful if improved performance is observed. To investigate different ways in which task-specific parameters can be increased, various implementations may run experiments for task-specific attention modules with different numbers of heads and hidden dimensions. In some implementations, task-specific attention modules with multiple layers may also be tested, but may not lead to noticeable performance improvement.

The results of these experiments are presented in Table 2. It is clear that, assuming a fixed value of $d_t$, changing the number of attention heads does not lead to a significant performance difference. Nonetheless, various implementations may conduct following tests with both two and four attention heads for completeness. Experiments were also conducted with one and eight attention heads, but degraded performance and training instability was observed.

As can be seen in Table 2, model performance on high-resource tasks consistently improves as $d_t$ is increased. Initially, T10 performance of the attention-based classification heads is quite low, which is mostly responsible for the performance gap observed in FIG. 6. However, despite improvements in T10 accuracy, B10 accuracy begins to degrade as $d_t$ becomes too large. This trend reveals that the larger task-specific heads provide needed capacity to high-resource tasks, but may simultaneously cause overfitting on tasks with fewer labels. Therefore, it is clear that only certain tasks benefit from extra task-specific parameters. Because the sizes of task-specific classification heads cannot be tuned by hand in the large-scale MTL domain (i.e., this would require manually setting $d_t$ for hundreds or thousands of task), there is a need for some heuristic that can be used to automatically allocate more parameters to the tasks that actually need them.

TABLE 2

Performance of different task-specific classification heads. For DyPA the dimensionality of task-specific attention heads in the lowest quartile is listed. This dimension increases by 2× in each following quartile.

| Task-head Type | # Attn. Heads | $d_t$ | Mean Acc. | T10 Acc. | B10 Acc. |
|---|---|---|---|---|---|
| Attention | 2 | 64 | 72.95% | 66.39% | 55.07% |
| | 4 | 64 | 72.28% | 66.41% | 51.29% |
| | 2 | 128 | 72.17% | 69.55% | 54.41% |
| | 4 | 128 | 72.28% | 68.85% | 52.04% |
| | 2 | 512 | 72.04% | 67.11% | 51.79% |
| | 4 | 512 | 73.74% | 68.70% | 51.43% |
| | 2 | 1024 | 73.69% | 69.72% | 51.06% |
| | 4 | 1024 | 73.69% | 69.72% | 51.05% |
| DyPA | 2 | 128 (2×) | 74.33% | 69.83% | 54.39% |
| | 4 | 128 (2×) | 74.18% | 69.77% | 54.00% |

Dynamic Parameter Allocation (DyPA) is a novel heuristic. The intuitive idea behind DyPA is to dynamically provide more task-specific parameters to complex or difficult tasks, which allows task-specific parameters to be automatically invested in areas where they are needed most. Because the number of task-specific parameters for each task cannot be hand-tuned in the large-scale MTL domain, DyPA provides a simple methodology for allocating parameters between tasks efficiently and automatically.

In DyPA, the number of labels associated with each task may be used as a proxy for a task's complexity. Each task may have its associated number of labels normalized with respect to the distribution of the number of labels for all other tasks, providing each task with a normally-distributed complexity score. Using this score, all tasks may be separated into quartiles. Then, the size of a task's classification head may be determined by the quartile in which it resides. Tasks in higher quartiles may be given larger task-specific classification heads (i.e., a larger value of dt) and vice versa. Various implementations of DyPA may use attention-based classification heads, but the scheme may be easily generalized to other task-specific module variants.

DyPA introduces a few new hyperparameters, as one must decide the sizes of task-specific heads to be used in the first and last quartiles. For example, $d_t$ may be specified for the first and fourth quartiles, then the value of $d_t$ for the second and third quartiles may be linearly interpolated. During experiments, it may be observed that T10 accuracy begins to saturate as d>>1024. Therefore, various implementations may set d=128 and $d_t$=1024 for the first and fourth quartiles, respectively (i.e., quartiles two and three then have sizes 256 and 512). Using these settings, DyPA may be tested with both two and four attention heads. As can be seen in Table 2, DyPA achieves improved mean and T10 accuracy in comparison to fixed-size, attention-based classification heads, while maintaining comparable B10 accuracy. In other words, DyPA may improve performance on high-resource tasks without causing overfitting on low-resource tasks. Surprisingly, DyPA may achieve these performance improvements while still using roughly 3.5× fewer task-specific parameters in comparison to fully-connected classification heads.

The performance of various implementations of a final large-scale MTL methodology, comprised of both novel proposals and best practices of previous work in the MTL domain, has been evaluated over both the 100 and 500-task dataset. For baseline performance, various implementations may train individual models over each task separately and compute the performance of each individual model to derive performance across tasks. It should be noted that this baseline is comprised of 100 different BERT models and is nearly infeasible to use in practice. For the 500-task dataset, a baseline of individually-trained models was purposely excluded for this reason (i.e., training 500 separate BERT models seemed unreasonable). However, it is demonstrated that our methodology may be used to effectively train a single model across all tasks to non-trivial accuracy, even in the case of hundreds of tasks.

The performance of the proposed MTL methodology in comparison to individually-trained baseline models is shown in Table 3 for the 100-task dataset. As can be seen, the MTL yields significant improvements on nearly all metrics. The largest improvements are observed in mean and B10 accuracy, which improve by 10% and 20%, respectively.

The baseline is expected to struggle most on low-resource tasks (i.e., those with fewer labels), as solving tasks in isolation is difficult without sufficient training data. As a result, the baseline B10 accuracy is quite poor. The proposed methodology aims to improve performance on these low-resource tasks by leveraging positive inductive transfer from other, related tasks. In other words, by simultaneously learning many tasks, the model receives improved supervision that enables better generalization performance on the low-resource tasks. With the use of MTL, various implementations show that the B10 accuracy may be improved by 20% (see Table 3), thus proving the significant impact of positive inductive transfer provided by our proposed methodology.

Although an improvement on low-resource tasks may be observed, this should not come at the cost of significantly degraded performance on high-resource tasks. As is seen in Table 3, the T10 accuracy of our MTL model decreases by <2.5% in comparison to the baseline. We argue that this performance decrease is minor relative to the improvements on other tasks in the dataset. To understand this view, one can first observe that global accuracy increases by roughly 3% with the use of MTL. This increase in global accuracy reveals that a greater number of products are being classified correctly in aggregate across the entire dataset. Furthermore, mean task accuracy improves by over 10% with the use of MTL, thus showing that the majority of tasks within the 100-task dataset achieve significantly improved performance in comparison to the baseline. Therefore, these results indicate that the model trained with our proposed methodology, in addition to compressing 100 BERT models into a single model, yields a significant performance benefit on nearly all tasks.

To test the ability of the proposed methodology to generalize to larger numbers of tasks, various implementations may train a model over a new dataset comprised of 500 tasks. The goal of these experiments may be to demonstrate that a large-scale MTL methodology may be able to handle larger numbers of tasks (i.e., >100 tasks), while maintaining comparable performance to the 100 task case (i.e., adding more tasks should not deteriorate performance). This larger dataset is constructed identically to the 100 task dataset, but with the use of more e-commerce sites. Because the tasks displayed in FIG. 2 are a random sampling of 100 tasks from the set of total available e-commerce sites, the 500 task dataset is quite similar, as it is comprised of more tasks randomly sampled from the same distribution. To make the evaluation of models trained on larger datasets comparable to the performance of other models, various implementations may perform evaluation only over the original 100 tasks, and use the remaining tasks only for training purposes. As the number of tasks is increased, the total number of epochs during training is reduced accordingly to make total training time comparable between the 100-task dataset and larger datasets.

The results of experiments over larger datasets are given in Table 3. As can be seen, performance on the 500-task dataset exceeds the performance of individually-trained baseline models significantly. Again, the performance of low-resource tasks may be significantly improved in comparison to the baseline (i.e., 18.4% improvement in B10 accuracy), thus highlighting that training simultaneously on all tasks yields noticeable positive inductive transfer. Furthermore, the mean accuracy of the 500-task model is within 1% of the 100-task model's mean accuracy, proving that both models achieve comparable performance over the validation set. It should be noted that this comparable performance is measured only over the original 100 tasks, and the 500-task model is still solving 400 extra tasks on top of this. The competitive performance of the 500-task model demonstrates that the proposed methodology is generally useful in the large-scale MTL domain, capable of generalizing to significantly increased numbers of tasks. Additionally, these results further demonstrate the shocking capacity of BERT models. Given the correct training methodology, BERT is proven to be capable of solving hundreds of tasks simultaneously—a feat that is orders of magnitude beyond current efforts in MTL research.

Similarly to pre-trained transformer models, various implementations of large-scale MTL models may be trained over large datasets to simultaneously perform several tasks. Intuitively, then, the model parameters learned through large-scale MTL should be useful for transfer learning purposes. To test this theory, various implementations may fine-tune models that are "pre-trained" with large-scale MTL over a separate e-commerce classification dataset. This dataset contains 405,840 examples and 2,196 unique classes. The dataset consists of examples across numerous e-commerce websites. In other words, it is a unified ontology of product categories across many e-commerce websites.

The model used for fine-tuning may be the same as shown in FIG. 1. However, the transformer backbone of this model may be initialized using either BERT-base or the parameters of a large-scale MTL model (i.e., various implementations test weights from the 100 task case). The entire model may then be fine-tuned for 10 epochs on the downstream ontology classification task. Learning rate and weight may be selected with a grid search using a hold-out validation set. Then, the model may be retrained on the full dataset with optimal hyperparameters to measure test performance. The final test accuracy of the fine-tuned models may then be reported to compare performance of the different initialization strategies.

The performance of the fine-tuned models, which are averaged across three separate trials, are shown Table 4. As can be seen, initializing the model with weights learned through large-scale MTL yields improved downstream performance in comparison to a BERT-base initialization. Given the extensive pre-training of BERT-base, this consistent, noticeable improvement in transfer learning performance is quite surprising (i.e., our 100-task model is trained on a single V100 GPU in roughly one day). This performance improvement demonstrates the representations learned through large-scale MTL are generalizable to other tasks and useful for transfer-learning purposes.

TABLE 3

Comparison of individual models trained for each task to the performance of MTL over all tasks with our proposed approach.

| Method | Global Acc. | Mean Acc. | T10 Acc. | B10 Acc. |
|---|---|---|---|---|
| Baseline | 71.46% | 61.50% | 72.33% | 34.40% |
| 100 Task | 73.28% ± 0.89 | 73.29% ± 0.43 | 69.30% ± 0.53 | 54.39% ± 0.42 |
| 500 Task | 69.73% ± 0.26 | 72.54% ± 0.13 | 67.36% ± 0.13 | 52.80% ± 1.80 |

TABLE 4

Classification performance for models initialized
with either pre-trained BERT weights or large-scale MTL
weights, then fine-tuned on a downstream classification task.

| Pre-Trained Method | Test Accuracy |
|---|---|
| BERT-Base | 90.27% ± 0.002 |
| MTL (100 Task) | 90.77% ± 0.001 |

The proposed model architecture, as shown in FIG. 1, uses BERT-base as a shared backbone between all tasks. Intuitively, increasing the capacity of this transformer backbone could yield improved model performance in the large-scale MTL domain. To test this, the BERT-base backbone may be replaced with BERT-large (i.e., deeper and wider version of the same model), and various implementations may train this larger model on the 100-task MTL dataset. The results obtained with this BERT-large backbone are shown in Table 5. The larger model obtains slightly improved mean accuracy, but is outperformed by the BERT-base model on all other metrics. Because increasing the capacity of the transformer backbone does not yield noticeably improved performance, these experiments clearly demonstrate the shocking capacity of the BERT-base model in the large-scale MTL domain. Namely, BERT-base has seemingly sufficient capacity to perform well across hundreds of tasks simultaneously, even in comparison to a model containing 4× more parameters. Therefore, the BERT architecture, even in its smallest form, is shown to be highly robust, capable of achieving significantly more with a single model than was previously thought possible.

TABLE 5

Comparison of MTL models trained on the 100-task
dataset with both BERT-base and BERT-large used as backbones.

| Model | Global Acc. | Mean Acc. | T10 Acc. | B10 Acc. |
|---|---|---|---|---|
| BERT Base | 73.28% ± 0.89 | 73.29% ± 0.43 | 69.30% ± 0.53 | 54.39% ± 0.42 |
| BERT Large | 72.17 ± 0.07 | 73.39 ± 0.39 | 68.81 ± 0.64 | 52.24 ± 0.93 |

Several aspects of our proposed methodology, including a-decay and DyPA, depend upon the distribution over number of labels for each task. Consequently, one could easily argue that the model's performance would be sensitive to the properties of this distribution. For example, adding a single, very large task into the set of possible tasks could skew the distributions used for sampling and binning in a-decay and DyPA, respectively, causing a noticeable performance degradation. To test this, various implementations may add the ontology classification dataset as another task within the 100-task dataset, creating a total of 101 tasks. As can be seen in FIG. 2, the tasks in the original 100-task dataset have no more than 30K labels each. Therefore, the ontology classification dataset, containing 405,840 examples, is an order of magnitude larger than any task in the 100-task dataset, allowing us to observe whether the addition of such a task is detrimental to model performance.

Figure 7:
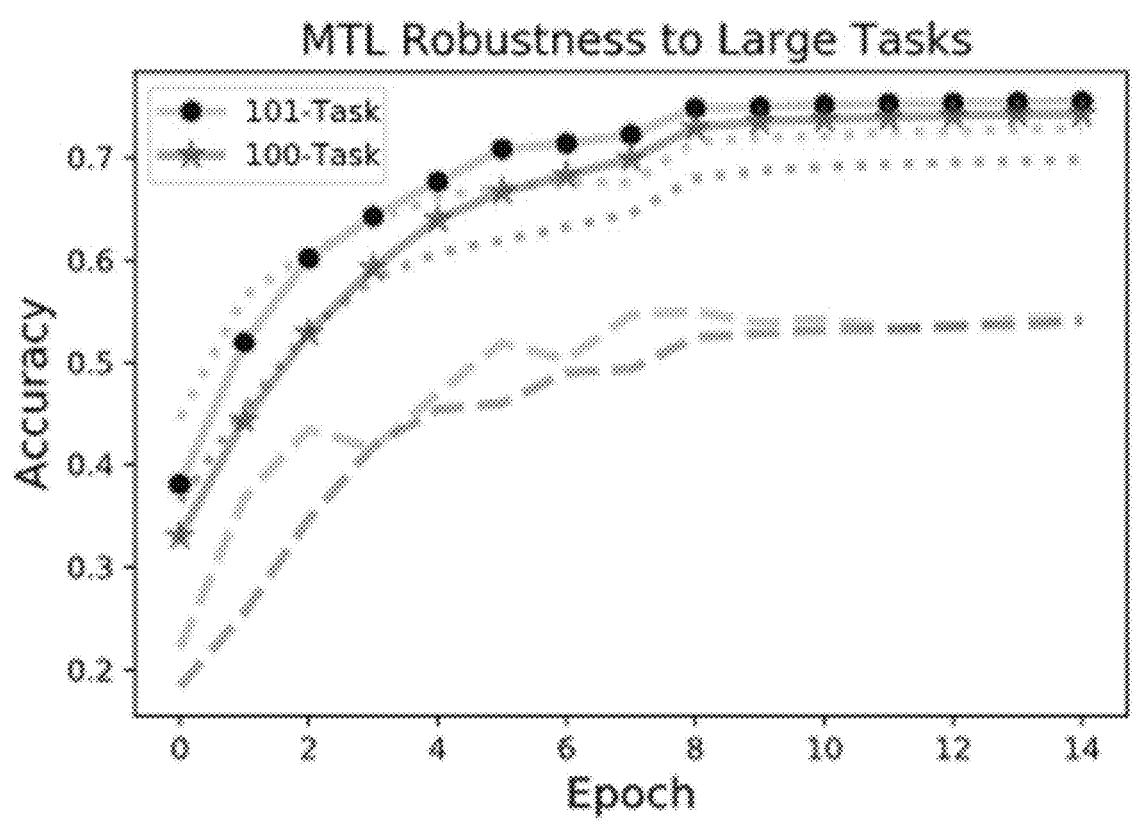
FIG. 7 illustrates a sample graph of multi-task learning (MTL) robustness to large tasks according to some example implementations.

The results of this experiment are shown in FIG. 7. As can be seen, not only is the proposed methodology robust to the addition of the large task, but actually sees a benefit. In particular, the further positive inductive transfer was achieved by the addition of the larger task, thus causing performance on other, smaller tasks to be improved on all measures (i.e., mean, T10, and B10 accuracy all increase). Therefore, it is clear that the proposed methodology is quite robust to the addition of different tasks to the dataset, and can even benefit from the addition of more and larger tasks.

FIG. 8 illustrates a method 800 for exceeding the limits of visual-linguistic multi-task learning, as disclosed herein. In various implementations, the steps of method 800 may be performed by a server, such as electronic device 900 of FIG. 9A or system 940 of FIG. 9B, and/or by software executing on a server or distributed computing platform. Although the steps of method 800 are presented in a particular order, this is only for simplicity.

In step 802, a multi-modal multi-task classification dataset may be identified. In various implementations, the multi-modal multi-task classification dataset may be based on a large number of data examples associated with products. For example, the dataset may be based on over 250,000 products variously offered by fifty (50) websites, such as ecommerce websites. In some implementations, at least one data example associated with a product may include textual data (e.g., a name or description of a product) and a plurality of images (e.g., pictures depicting a product).

In step 804, a transformer machine learning model may be created to predict categorical attributes of a product. In various implementations, the transformer machine learning model may include, for example, a preprocessing layer, a transformer layer, and an output layer. In some implementations, the transformer layer may be based on or otherwise include a bidirectional encoder representations from transformers (BERT) architecture.

In some implementations, the output layer may include a plurality of task-specific classification heads. For example, a product may include a plurality of associated categorical attributes (e.g., type, category) and a task may represent a prediction of a categorical attribute. As such, a task-specific classification head may represent, for example, a prediction of one categorical attribute.

In some implementations, the output layer may include 100 task-specific classification heads. For example, for a product offered by fifty (50) different websites, a type categorical attribute and a category categorical attribute may be predicted for the product for each of the websites. As such, 100 different tasks or predictions may be performed (i.e., 50 type predictions (one for each of the 50 websites) and 50 category predictions (one for each of the 50 websites).

In step 806, the transformer machine learning model may be trained using an alpha decay schedule and dynamically allocated task-specific parameters. In various implementations, the alpha decay schedule may be selected, for example, from one of demon, linear, cosine, exponential, or other alpha decay schedule.

In various implementations, task-specific parameters may be dynamically allocated by assigning a normally-distributed complexity score to at least one task, dividing the plurality of task-specific classification heads into four quartiles based on the normally-distributed complexity score, and assigning a first number of task-specific parameters to a first quartile of task-specific classification heads, a second number of task-specific parameters to a second quartile of task-specific classification heads, a third number of task-specific parameters to a third quartile of task-specific classification heads, and a fourth number of task-specific parameters to a fourth quartile of task-specific classification heads.

In step 808, categorical attributes may be predicted using the trained transformer machine learning model. For example, for a new product, categorical attributes of the new product may be predicted using the trained transformer machine learning model.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 9A:
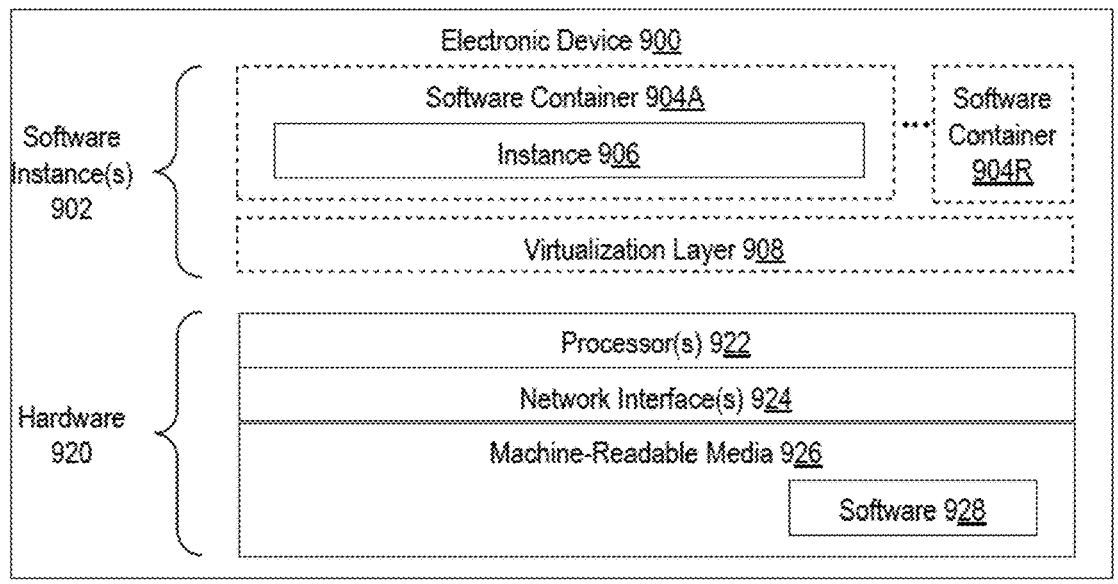
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and machine-readable media 926 having stored therein software 928 (which includes instructions executable by the set of one or more processor(s) 922). The machine-readable media 926 may include non-transitory and/or transitory machine-readable media. Each of the previously described clients and dynamic personalized API assembly may be implemented in one or more electronic devices 900. In one implementation: 1) each of the clients is implemented in a separate one of the electronic devices 900 (e.g., in end user devices where the software 928 represents the software to implement clients to interface directly and/or indirectly (e.g., software 928 represents a web browser, a native client, a portal, a command-line interface, and/or an application programming interface (API) based upon protocols such as Simple Object Access Protocol (SOAP), Representational State Transfer (REST), etc.)); 2) a server implemented in a separate set of one or more of the electronic devices 900 (e.g., a set of one or more server devices where the software 928 represents the software to implement the framework for modeling heterogeneous feature sets); and 3) in operation, the electronic devices implementing the clients and servers would be communicatively coupled (e.g., by a network) and would establish between them (or through one or more other layers and/or other services) connections. Other configurations of electronic devices may be used in other implementations (e.g., an implementation in which the client and server are implemented on a single one of electronic device 900).

During operation, an instance of the software 928 (illustrated as instance 906 and referred to as a software instance; and in the more specific case of an application, as an application instance) is executed. In electronic devices that use compute virtualization, the set of one or more processor(s) 922 typically execute software to instantiate a virtualization layer 908 and one or more software container(s) 904A-904R (e.g., with operating system-level virtualization, the virtualization layer 908 may represent a container engine running on top of (or integrated into) an operating system, and it allows for the creation of multiple software containers 904A-904R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-904R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 928 is executed within the software container 904A on the virtualization layer 908. In electronic devices where compute virtualization is not used, the instance 906 on top of a host operating system is executed on the "bare metal" electronic device 900. The instantiation of the instance 906, as well as the virtualization layer 908 and software containers 904A-904R if implemented, are collectively referred to as software instance(s) 902.

Alternative implementations of an electronic device may have numerous variations from that described above. For example, customized hardware and/or accelerators might also be used in an electronic device.

Figure 9B:
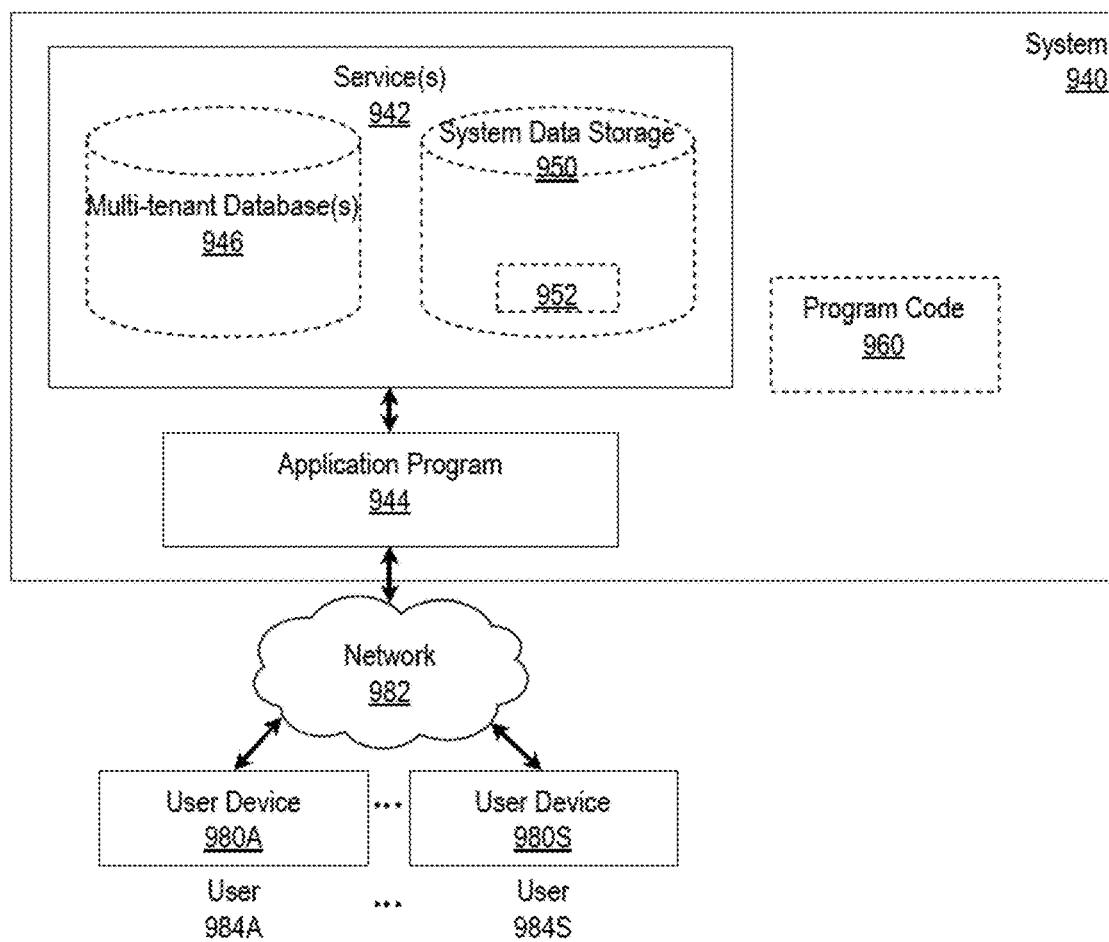
FIG. 9B is a block diagram of a deployment environment according to some example implementations.

FIG. 9B is a block diagram of a deployment environment according to some example implementations. A system 940 includes hardware (e.g., a set of one or more server devices) and software to provide service(s) 942, including dynamic personalized API assembly. In some implementations the system 940 is in one or more datacenter(s). These datacenter(s) may be: 1) first party datacenter(s), which are datacenter(s) owned and/or operated by the same entity that provides and/or operates some or all of the software that provides the service(s) 942; and/or 2) third-party datacenter(s), which are datacenter(s) owned and/or operated by one or more different entities than the entity that provides the service(s) 942 (e.g., the different entities may host some or all of the software provided and/or operated by the entity that provides the service(s) 942). For example, third-party datacenters may be owned and/or operated by entities providing public cloud services.

The system 940 is coupled to user devices 980A-980S over a network 982. The service(s) 942 may be on-demand services that are made available to one or more of the users 984A-984S working for one or more entities other than the entity which owns and/or operates the on-demand services (those users sometimes referred to as outside users) so that those entities need not be concerned with building and/or maintaining a system, but instead may make use of the service(s) 942 when needed (e.g., when needed by the users 984A-984S). The service(s) 942 may communicate with each other and/or with one or more of the user devices 980A-980S via one or more APIs (e.g., a REST API). In some implementations, the user devices 980A-980S are operated by users 984A-984S, and each may be operated as a client device and/or a server device. In some implementations, one or more of the user devices 980A-980S are separate ones of the electronic device 900 or include one or more features of the electronic device 900.

In some implementations, the system 940 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 940 is a multi-tenant cloud computing architecture supporting multiple services, such as one or more of the following types of services: Customer relationship management (CRM); Configure, price, quote (CPQ); Business process modeling (BPM); Customer support; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 940 may include an application platform 944 that enables PAAS for creating, managing, and executing one or more applications developed by the provider of the application platform 944, users accessing the system 940 via one or more of user devices 980A-980S, or third-party application developers accessing the system 940 via one or more of user devices 980A-980S.

In some implementations, one or more of the service(s) 942 may use one or more multi-tenant databases 946, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user devices 980A-980S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the multi-tenant database(s) 946 and/or system data storage 950.

In some implementations, the service(s) 942 are implemented using virtual applications dynamically created at run time responsive to queries from the user devices 980A-980S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 940 and the user devices 980A-980S.

Each user device 980A-980S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 940. For example, the user interface device can be used to access data and applications hosted by system 940, and to perform searches on stored data, and otherwise allow one or more of users 984A-984S to interact with various GUI pages that may be presented to the one or more of users 984A-984S. User devices 980A-980S might communicate with system 940 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 980A-980S might include an HTTP client, commonly referred to as a "browser," for sending and receiving HTTP messages to and from server(s) of system 940, thus allowing users 984A-984S of the user devices 980A-980S to access, process and view information, pages and applications available to it from system 940 over network 982.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for exceeding the limits of visual-linguistic multi-task learning (MTL), the method comprising:
   identifying a multi-modal multi-task unified ontology classification dataset comprising a plurality of data examples, at least one data example associated with a product and comprising textual data describing the associated product and a plurality of images of the associated product;
   creating a MTL-based single-stream transformer machine learning model to predict a plurality of categorical attributes of a product, the MTL-based single-stream transformer machine learning model comprising:
      a preprocessing layer forming a single input sequence;
      a transformer layer; and
      an output layer comprising a plurality of task-specific classification heads, a task representing a prediction of a categorical attribute; and
   training the visual-linguistic MTL-based single-stream transformer machine learning model, simultaneously across all tasks, based on the multi-modal multi-task unified ontology classification dataset using an alpha decay schedule and dynamically allocating task-specific parameters for at least one of the plurality of task-specific classification heads based on task complexity, leveraging positive inductive transfer, from related tasks, for low-resource tasks.

2. The computer-implemented method of claim 1, further comprising utilizing the trained transformer machine learning model to predict categorical attributes of a product.

3. The computer-implemented method of claim 1, wherein dynamically allocating task-specific parameters for at least one of the plurality of task-specific classification heads based on task complexity comprises:
   assigning a normally-distributed complexity score to at least one task;
   dividing the plurality of task-specific classification heads into four quartiles based on the normally-distributed complexity score; and
   assigning a first number of task-specific parameters to a first quartile of task-specific classification heads, a second number of task-specific parameters to a second quartile of task-specific classification heads, a third number of task-specific parameters to a third quartile of task-specific classification heads, and a fourth number of task-specific parameters to a fourth quartile of task-specific classification heads, wherein the first number is less than the second number, the second number is less than the third number, and the third number is less than the fourth number.

4. The computer-implemented method of claim 3, wherein:
   the first number of task-specific parameters is 64;
   the second number of task-specific parameters is 128;
   the third number of task-specific parameters is 512; and
   the fourth number of task-specific parameters is 1024.

5. The computer-implemented method of claim 1, wherein:
   the plurality of data examples comprises data examples from a plurality of ecommerce websites; and
   for at least one product offered by at least two of the plurality of ecommerce websites, the plurality of categorical attributes comprises at least a first categorical attribute having a different value for the at least two of the plurality of ecommerce websites and at least a second categorical attribute having a different value for the at least two of the plurality of ecommerce websites.

6. The computer-implemented method of claim 1, wherein the plurality of categorical attributes includes one or more categorical attributes selected from the list comprising:
   type; and
   category.

7. The computer-implemented method of claim 1, wherein the alpha decay schedule is selected from the list comprising:
   demon;
   linear;
   cosine; and
   exponential.

8. The computer-implemented method of claim 1, wherein the transformer model comprises a bidirectional encoder representations from transformers architecture.

9. A non-transitory machine-readable storage medium that provides instructions that, if executed by a processor, are configurable to cause the processor to perform operations comprising:
   identifying a multi-modal multi-task unified ontology classification dataset comprising a plurality of data examples, at least one data example associated with a product and comprising textual data describing the associated product and a plurality of images of the associated product;
   creating a multi-task learning (MTL)-based single-stream transformer machine learning model to predict a plurality of categorical attributes of a product, the MTL-based single-stream transformer machine learning model comprising:
      a preprocessing layer forming a single input sequence;
      a transformer layer; and
      an output layer comprising a plurality of task-specific classification heads, a task representing a prediction of a categorical attribute; and
   training the visual-linguistic MTL-based single-stream transformer machine learning model, simultaneously across all tasks, based on the multi-modal multi-task unified ontology classification dataset using an alpha decay schedule and dynamically allocating task-specific parameters for at least one of the plurality of task-specific classification heads based on task complexity, leveraging positive inductive transfer, from related tasks, for low-resource tasks.

10. The non-transitory machine-readable storage medium of claim 9, further comprising utilizing the trained transformer machine learning model to predict categorical attributes of a product.

11. The non-transitory machine-readable storage medium of claim 9, wherein dynamically allocating task-specific parameters for at least one of the plurality of task-specific classification heads based on task complexity comprises:
   assigning a normally-distributed complexity score to at least one task;
   dividing the plurality of task-specific classification heads into four quartiles based on the normally-distributed complexity score; and
   assigning a first number of task-specific parameters to a first quartile of task-specific classification heads, a second number of task-specific parameters to a second quartile of task-specific classification heads, a third number of task-specific parameters to a third quartile of task-specific classification heads, and a fourth number of task-specific parameters to a fourth quartile of task-specific classification heads, wherein the first number is less than the second number, the second number is less than the third number, and the third number is less than the fourth number.

12. The non-transitory machine-readable storage medium of claim 11, wherein:
   the first number of task-specific parameters is 64;
   the second number of task-specific parameters is 128;
   the third number of task-specific parameters is 512; and
   the fourth number of task-specific parameters is 1024.

13. The non-transitory machine-readable storage medium of claim 9, wherein:
   the plurality of data examples comprises data examples from a plurality of ecommerce websites; and
   for at least one product offered by at least two of the plurality of ecommerce websites, the plurality of categorical attributes comprises at least a first categorical attribute having a different value for the at least two of the plurality of ecommerce websites and at least a second categorical attribute having a different value for the at least two of the plurality of ecommerce websites.

14. The non-transitory machine-readable storage medium of claim 9, wherein the transformer model comprises a bidirectional encoder representations from transformers architecture.

15. An apparatus comprising:
   a processor; and
   a non-transitory machine-readable storage medium that provides instructions that, if executed by a processor, are configurable to cause the processor to perform operations comprising:
      identifying a multi-modal multi-task unified ontology classification dataset comprising a plurality of data examples, at least one data example associated with a product and comprising textual data describing the associated product and a plurality of images of the associated product;
      creating a multi-task learning (MTL)-based single-stream transformer machine learning model to predict a plurality of categorical attributes of a product, the MTL-based single-stream transformer machine learning model comprising:
         a preprocessing layer forming a single input sequence;
         a transformer layer; and
         an output layer comprising a plurality of task-specific classification heads, a task representing a prediction of a categorical attribute; and
      training the visual-linguistic MTL-based single-stream transformer machine learning model, simultaneously across all tasks, based on the multi-modal multi-task unified ontology classification dataset using an alpha decay schedule and dynamically allocating task-specific parameters for at least one of the plurality of task-specific classification heads based on task complexity, leveraging positive inductive transfer, from related tasks, for low-resource tasks.

16. The apparatus of claim 15, wherein dynamically allocating task-specific parameters for at least one of the plurality of task-specific classification heads based on task complexity comprises:
   assigning a normally-distributed complexity score to at least one task;
   dividing the plurality of task-specific classification heads into four quartiles based on the normally-distributed complexity score; and
   assigning a first number of task-specific parameters to a first quartile of task-specific classification heads, a second number of task-specific parameters to a second quartile of task-specific classification heads, a third number of task-specific parameters to a third quartile of task-specific classification heads, and a fourth number of task-specific parameters to a fourth quartile of task-specific classification heads, wherein the first number is less than the second number, the second number is less than the third number, and the third number is less than the fourth number.

17. The apparatus of claim 16, wherein:
the first number of task-specific parameters is 64;
the second number of task-specific parameters is 128;
the third number of task-specific parameters is 512; and
the fourth number of task-specific parameters is 1024.

18. The apparatus of claim 15, wherein:
the plurality of data examples comprises data examples from a plurality of ecommerce websites; and
for at least one product offered by at least two of the plurality of ecommerce websites, the plurality of categorical attributes comprises at least a first categorical attribute having a different value for the at least two of the plurality of ecommerce websites and at least a second categorical attribute having a different value for the at least two of the plurality of ecommerce websites.

19. The apparatus of claim 15, wherein the alpha decay schedule is selected from the list comprising:
demon;
linear;
cosine; and
exponential.

20. The apparatus of claim 15, wherein the transformer model comprises a bidirectional encoder representations from transformers architecture.

* * * * *